United States Patent
Iwanaga et al.

(10) Patent No.: US 9,984,078 B2
(45) Date of Patent: *May 29, 2018

(54) DELETING FILES WRITTEN ON TAPE

(71) Applicant: International Business Machines Corporation, Armonk, NY (US)

(72) Inventors: Masayuki Iwanaga, Urayasu (JP); Yumiko Ohta, Yokohama (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/681,652

(22) Filed: Aug. 21, 2017

(65) Prior Publication Data

US 2017/0344561 A1    Nov. 30, 2017

Related U.S. Application Data

(63) Continuation of application No. 14/922,492, filed on Oct. 26, 2015, now Pat. No. 9,753,930.

(30) Foreign Application Priority Data

Nov. 4, 2014   (JP) ................. 2014-223996

(51) Int. Cl.
  *G06F 17/30*   (2006.01)
  *G11B 5/008*   (2006.01)
  *G11B 5/024*   (2006.01)

(52) U.S. Cl.
  CPC .... *G06F 17/30076* (2013.01); *G11B 5/00813* (2013.01); *G11B 5/024* (2013.01)

(58) Field of Classification Search
  CPC ......... G06F 17/30076; G06F 17/30563; G06F 17/30569; G06F 19/322; G11B 5/00813; G11B 5/024

See application file for complete search history.

(56) References Cited

U.S. PATENT DOCUMENTS 5,359,468 A * 10/1994 Rhodes ................. G11B 20/10
                                                                      360/32
5,384,673 A   1/1995 Yoshioka et al.
(Continued)

FOREIGN PATENT DOCUMENTS

JP    0258707 A    2/1990
JP    05274841 A   10/1993
(Continued)

OTHER PUBLICATIONS

Decision to Grant a Patent, Patent Application No. 2014-223996, IBM Docket No. JP920140042JP1, dated Mar. 25, 2016, 3 pages, English Translation.

(Continued)

*Primary Examiner* — Noosha Arjomandi
(74) *Attorney, Agent, or Firm* — Christopher M. Coy

(57) ABSTRACT

A method for writing a file from an application of a host onto a tape includes sequentially receiving records forming the file from the application, adding a predetermined number of segments of dummy data (dummy records) subsequently to the plurality of records forming the file such that the records of the file and records of a subsequent file are not included in the same data set, interposing the dummy records between a final record of the file and a head record of the subsequent (next) file, to thereby construct at least one data set that is adjacent to one data set and does not include the records of the file, and writing a data set including the records of the file, a data set (dummy data set) including the final record of the file and the dummy records, and a data set including the subsequent file, onto the tape.

1 Claim, 9 Drawing Sheets

RELATION AMONG FILES, RECORDS, AND DATA SETS WRITTEN ON TAPE MEDIUM

(56) References Cited

U.S. PATENT DOCUMENTS

| | | | |
|---|---|---|---|
| 6,389,222 B1 | 5/2002 | Ando et al. | |
| 6,628,423 B1* | 9/2003 | Sasaki | B41J 13/226 |
| | | | 101/232 |
| 8,139,311 B2* | 3/2012 | Oishi | G11B 5/584 |
| | | | 360/60 |
| 9,025,261 B1* | 5/2015 | Hasegawa | G11B 20/00007 |
| | | | 360/71 |
| 9,459,814 B1* | 10/2016 | Hasegawa | G11B 20/1201 |
| 9,536,561 B1* | 1/2017 | Hasegawa | G11B 5/00817 |
| 9,830,102 B2* | 11/2017 | Hasegawa | G06F 3/0643 |
| 2003/0074521 A1* | 4/2003 | Beeston | G11B 27/032 |
| | | | 711/111 |
| 2007/0079059 A1 | 4/2007 | Itagaki et al. | |
| 2014/0181396 A1* | 6/2014 | Vincent | G06F 3/0605 |
| | | | 711/111 |
| 2015/0055241 A1* | 2/2015 | Abe | G11B 20/1201 |
| | | | 360/48 |
| 2015/0293935 A1* | 10/2015 | Abe | G06F 17/30073 |
| | | | 707/611 |
| 2016/0124973 A1 | 5/2016 | Iwanaga et al. | |
| 2017/0125061 A1* | 5/2017 | Ashida | G11B 27/107 |
| 2017/0336999 A9* | 11/2017 | Hasegawa | G06F 3/0622 |

FOREIGN PATENT DOCUMENTS

| | | |
|---|---|---|
| JP | 07021070 A | 1/1995 |
| JP | 09213022 A | 8/1997 |
| JP | 10108132 A | 4/1998 |
| JP | 2003272299 A | 9/2003 |
| JP | 2004126909 A | 4/2004 |
| JP | 2005107856 A | 4/2005 |
| JP | 2006053721 A | 2/2006 |
| JP | 2006344177 A | 12/2006 |
| JP | 2007011522 A | 1/2007 |
| JP | 2007095231 A | 4/2007 |
| JP | 2007328818 A | 12/2007 |
| JP | 2009099207 A | 5/2009 |
| JP | 2010061537 A | 3/2010 |

OTHER PUBLICATIONS

Iwanaga et al., "Method, Program, and Tape Apparatus for Deleting File Written on Tape", Japan Application No. 2014-223996 (English Translation), filed on Nov. 4, 2014, pp. 1-39.

Iwanaga et al., "Deleting Files Written on Tape," U.S. Appl. No. 15/681,671, filed Aug. 21, 2017.

List of IBM Patents or Patent Applications Treated as Related, Aug. 8, 2017, 2 pgs.

* cited by examiner

LTFS FORMAT AND FILE ADDITION/UPDATE (A) INFORMATION THAT IS WRITTEN ONTO TAPE IMMEDIATELY AFTER INITIALIZATION IN LTFS FORMAT

IP: | FID | VOL1 Label | FM | LTFS Label | FM | Index #0 | FM |

DP: | FID | VOL1 Label | FM | LTFS Label | FM | Index #0 | FM |

(B) INFORMATION THAT IS WRITTEN ONTO TAPE IN THE CASE WHERE FILE 1 IS WRITTEN AFTER STATE OF (A)

IP: | FID | VOL1 Label | FM | LTFS Label | FM | Index #1 | FM |

DP: | FID | VOL1 Label | FM | LTFS Label | FM | Index #0 | FM | File 1 | FM | Index #1 | FM |

(C) INFORMATION THAT IS WRITTEN ONTO TAPE IN THE CASE WHERE PLURALITY OF FILES (FILE 2) ARE WRITTEN AFTER STATE OF (B)

IP: | FID | VOL1 Label | FM | LTFS Label | FM | Index #2 | FM |

DP: | FID | VOL1 Label | FM | LTFS Label | FM | Index #0 | FM | File 1 | FM | Index #1 | FM | File 2 | FM | Index #2 | FM |

(D) INFORMATION THAT IS WRITTEN ONTO TAPE AFTER FILE 1 IS UPDATED BY ADDING CHARACTER INFORMATION (FILE 1-2) TO TAIL END OF FILE 1 AFTER STATE OF (B)

IP: | FID | VOL1 Label | FM | LTFS Label | FM | Index #2 | FM |

DP: | FID | VOL1 Label | FM | LTFS Label | FM | Index #0 | FM | File 1-1 | FM | Index #1 | FM | File 1-2 | FM | Index #2 | FM |

Figure 5

REWRITING OF FILE 1 (SIZE L) AND EXTENTS
(POSITION META-INFORMATION INCLUDED IN INDEX FILE)
(A) REWRITING OF FILE 1 (SIZE L) AND EXTENT
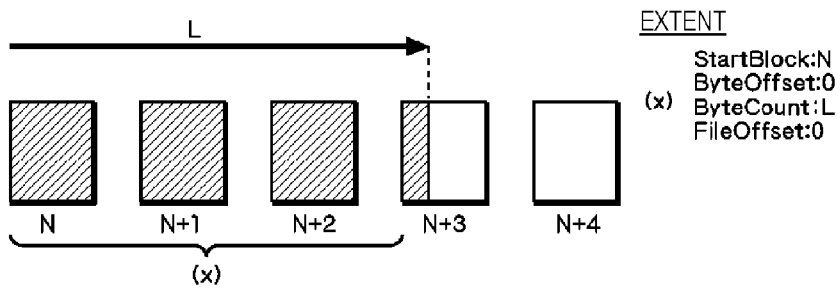
(B) EXTENTS WHEN DATA PORTION OF 600 KB FROM $M^{TH}$ BYTE IN FILE 1 IS REWRITTEN BY DATA OF 250 KB
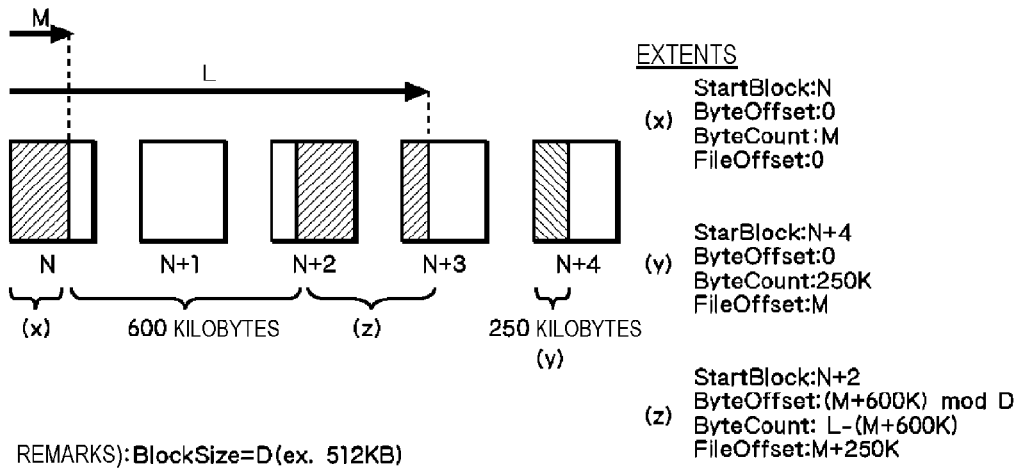
REMARKS): BlockSize=D(ex. 512KB)
Figure 6

DELETING FILES WRITTEN ON TAPE

BACKGROUND OF THE INVENTION

The present invention relates to physically deleting the content of a file recorded in a tape medium (a tape, a medium) in a tape apparatus (tape drive).

A tape drive is used as a storage apparatus for recording information as a backup in a tape for a long period. IBM publishes the format of a file system for a tape drive called a linear tape file system (LTFS), and publishes the codes thereof in an open source manner. The LTFS divides a tape medium into two regions of an index partition (IP) and a data partition (DP). Meta-information (index) such as a file name is mainly recorded in the former, and the main body of a file is mainly recorded in the latter. In the case where a file stored in the tape medium is deleted using the LTFS, information concerning the file is deleted from the index in the IP. Even if the file is deleted, data that is stored in the DP and corresponds to the main body of the file continues to remain. This means that, even after the file is deleted, it is technically possible to read the data corresponding to the main body of the deleted file.

From the perspective of data security, after a user who uses the LTFS delivers data using a tape medium for the purpose of data exchange between companies or the like, the user desires to prevent the data on the medium from being read. A SCSI command called Long Erase is exemplified as a function of preventing the data written on the tape medium from being read. According to this command, a high frequency pattern is written from a location designated by the user to a tail portion of the partition, whereby the previously recorded data can be prevented from being read. If data recorded in a head portion of the DP is deleted using Long Erase, approximately three hours are required, because of such a mechanism that the data is deleted over the entire tape length. This required time is unavoidable in order to delete every data recorded over the entire tape length.

SUMMARY

As disclosed herein, a method for writing, by a tape apparatus, a file from an application of a host onto a tape includes sequentially receiving records forming the file from the application, adding a predetermined number of segments of dummy data (dummy records) subsequently to the plurality of records forming the file such that the records of the file and records of a subsequent file are not included in the same data set, interposing the dummy records between a final record of the file and a head record of the subsequent (next) file, to thereby construct at least one data set that is adjacent to one data set and does not include the records of the file, and writing a data set including the records of the file, a data set (dummy data set) including the final record of the file and the dummy records, and a data set including the subsequent file, onto the tape.

Also disclosed herein is method for deleting a specific file from a tape on which files are written using the above-mentioned writing method. This deleting method includes receiving a request to delete a file to be deleted, from an application, acquiring a head position of a data set including a head record of the file to be deleted, acquiring a head position of a data set including a head record of a file written immediately after the file to be deleted, and writing a high frequency pattern from the first acquired head position to the second acquired head position.

BRIEF DESCRIPTION OF THE DRAWINGS

FIG. 5 illustrates contents of an index partition and a data partition of a medium in a LTFS format;

FIG. 6 illustrates changed contents of position meta-information and a file data portion (extent) included in an index file in the case where one file is partially rewritten;

DETAILED DESCRIPTION

The present invention aims at solving a problem that an arbitrary file stored in a tape cannot be overwritten without destroying other files. In view of this, the present invention provides a special method for writing a file onto a tape on the premise that the file can be completely deleted. The present invention further provides a method for enabling physical deletion of a file. Accordingly, the present invention has an object to provide a method, a tape drive, and a program for physically deleting the content of an arbitrary file recorded in a tape medium, in a file system for the tape drive.

The method disclosed herein may enable the data main body of an arbitrary file to be deleted in a short time without any influence on other files. The tape drive enables an arbitrary file to be physically overwritten in a short time using a high frequency pattern. Moreover, the tape drive records dummy data between adjacent files, to thereby enable a specific file to be physically deleted without any influence on other files.

Figure 1:
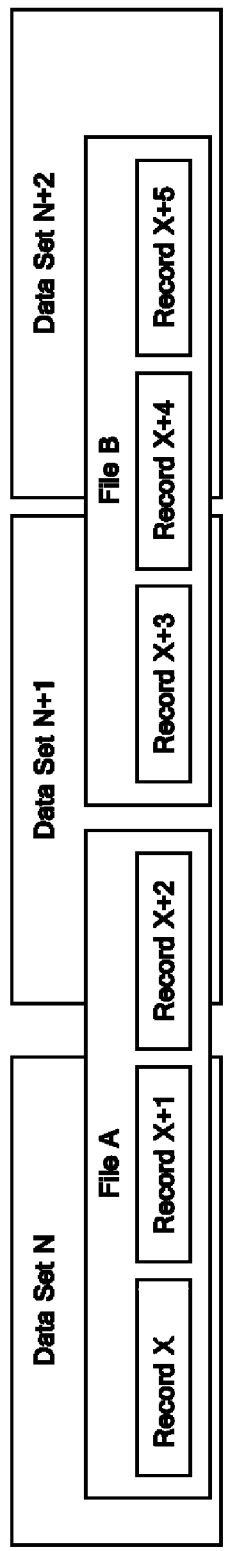
FIG. 1 illustrates a relation among files, records, and data sets written on a tape medium.

FIG. 1 illustrates a relation among files, records, and data sets written on a tape medium. An application of a host issues a write request to a tape drive via the LTFS in units of files. When the tape drive writes variable-length data (record) sent from the LTFS onto a tape, the tape drive restructures the data into fixed-length blocks called data sets, and writes the data in units of the data sets. The maximum length of a record, which is different depending on each environment, is generally approximately 1 MB, and a file having a size larger than 1 MB is divided into a plurality of records. A relation among files, records, and data sets written on a tape medium is as illustrated in FIG. 1. The volume of each data set is uniquely defined for each tape medium format, and is generally approximately several megabytes. Similarly at the time of reading data from the tape medium, the tape drive reads the data from the tape medium in units of data sets, and transmits a target record included in a data set to the LTFS. A file stored in a tape medium is deleted using the LTFS in some cases.

Information concerning the file is simply deleted from the index in the IP. It is technically possible to read data corresponding to the main body of the file, because the file is deleted in such a manner that the data that is stored in the DP and corresponds to the main body of the file continues to remain.

Figure 2:
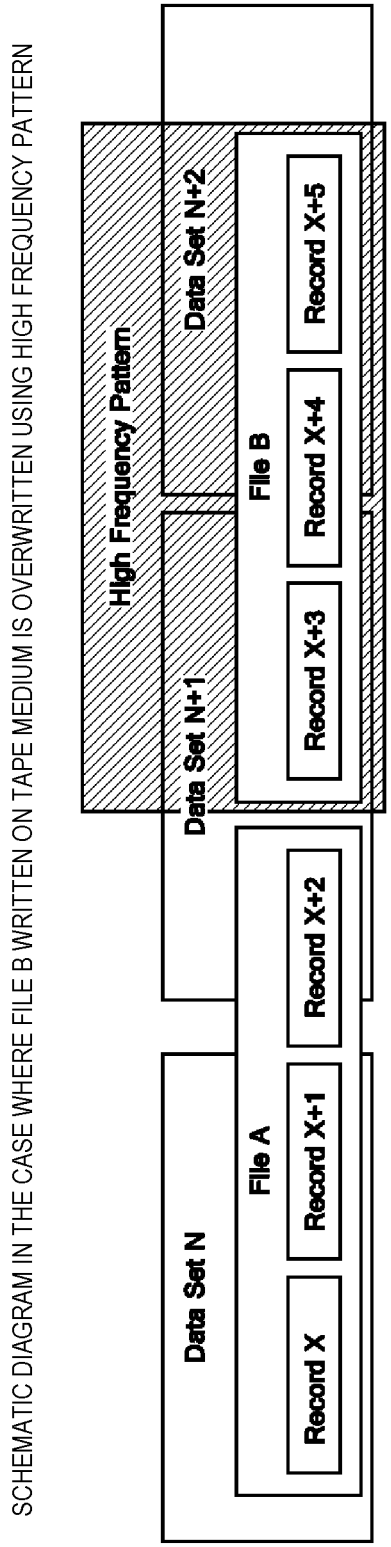
FIG. 2 illustrates a schematic diagram in the case where File B written on a tape medium is overwritten using a high frequency pattern.

FIG. 2 illustrates a schematic diagram in the case where File B written on a tape medium is overwritten using a high frequency pattern. In actuality, for example, the contents of File A and File B are recorded within a data set N+1 by means of a function called interleaving, and only the File B portion cannot be overwritten. For example, it is assumed that only the File B portion can be overwritten without using the interleaving function. As indicated by a shaded portion in FIG. 2, if File B in FIG. 1 is overwritten using the high frequency pattern, a large part of the data set N+1 is overwritten. The tape drive cannot read the data set N+1 on the tape even using a correction code. This means that a last portion of File A cannot be read. That is, in the case where a file to be deleted and a file to be held exist within a data set, only the content of the file to be deleted cannot be physically overwritten.

Description is given below of an embodiment mode (embodiment) in the case where a plurality of files are written (recorded) onto a tape and where an arbitrary file is deleted from the plurality of recorded files, in a storage system including a tape drive connected to a host.

The present invention provides a special method for writing a file onto a tape on the premise that the file can be completely deleted. When a plurality of files are written onto a tape, the files are written onto the tape while data as a dummy (dummy data or a dummy record) that is interposed between adjacent files. The present invention relates to a method for interposing a predetermined number of dummy records having a predetermined size at the time of recording, to thereby enable an arbitrary file to be physically overwritten in a short time using a high frequency pattern without any influence on other files.

First, in the stage of file writing, when a plurality of files are stored into a tape medium, the files are recorded while dummy data is interposed between adjacent files. Then, in the stage of deletion of an arbitrary file among the plurality of files sequentially written onto the tape, the arbitrary file can be physically overwritten using a high frequency pattern. As a result, the data main body of the arbitrary file can be deleted in a short time without any influence on other files.

In order to describe a basic operation of the embodiment of the present invention, the LTFS format, the tape drive, and file data writing by the LTFS are described.

Figure 3:
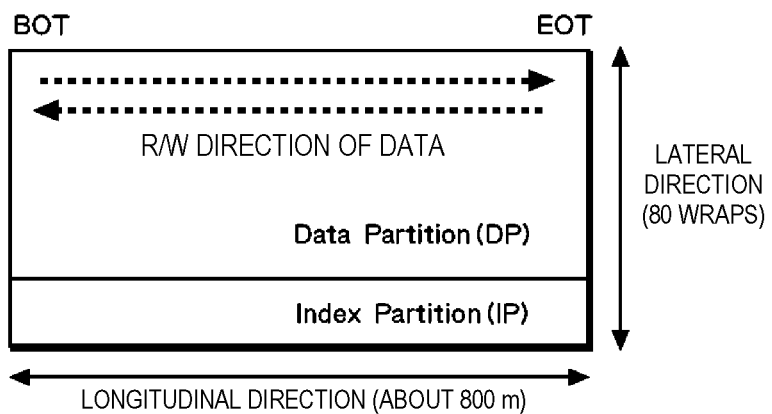
FIG. 3 illustrates a tape divided into two partitions of a LTFS.

FIG. 3 illustrates a tape divided into two partitions of the LTFS. A LTO5 tape drive writes data while moving back and forth on wraps of a write region along the longitudinal direction of the tape. In the LTFS, two (corresponding to one round trip) of the wraps are used as an index partition. The tape is divided into the two partitions (IP and DP) from the beginning of the tape (BOT) to the end of the tape (EOT). A unit for a head to read and write at the same time is a track, and sixteen tracks correspond to one wrap. In a tape cartridge of the LTO5, the tape has a length of about 800 m in its longitudinal direction, and has a width corresponding to eighty wraps in its lateral direction. The IP and the DP are separated from each other by a protection region (guard band) configured by two wraps. The tape moves back and forth in the wrap longitudinal direction, and the motion that the travelling direction is reversed at each of the BOT and the EOT is called wrap turn. The time required for the tape to move from the BOT to the EOT in the longitudinal direction with respect to the head of the tape drive is 60 to 90 seconds. The time required for the tape to move up to the half in the longitudinal direction is about 30 to 45 seconds.

In the file system for the tape drive, for example, the LTFS, data written on a medium can be shown as a file. If the user writes data onto a tape medium using the LTFS, meta-information called index file (simply referred to as index, too) is written onto the tape medium, in addition to the file main body. The index includes, using an XML format, a directory name, a file name, a file creation date, and position meta-information (an extent described in FIG. 6) including a position on the medium, a size, and an offset in the file, as the meta-information. The latest index is mainly written onto the IP. The file main body and the index history are written onto the DP.

In the case where a file on a tape medium is read and written using the LTFS, data is read and written in units called record. The record is called block in the LTFS, and a LTFS format is given thereto. Each block is managed for each partition in which the data of the file is recorded, on the basis of a block number indicating how many blocks precede this block from the beginning of the partition. The index of each file includes the position information indicated by the block numbers corresponding to the data of the file.

Figure 4:
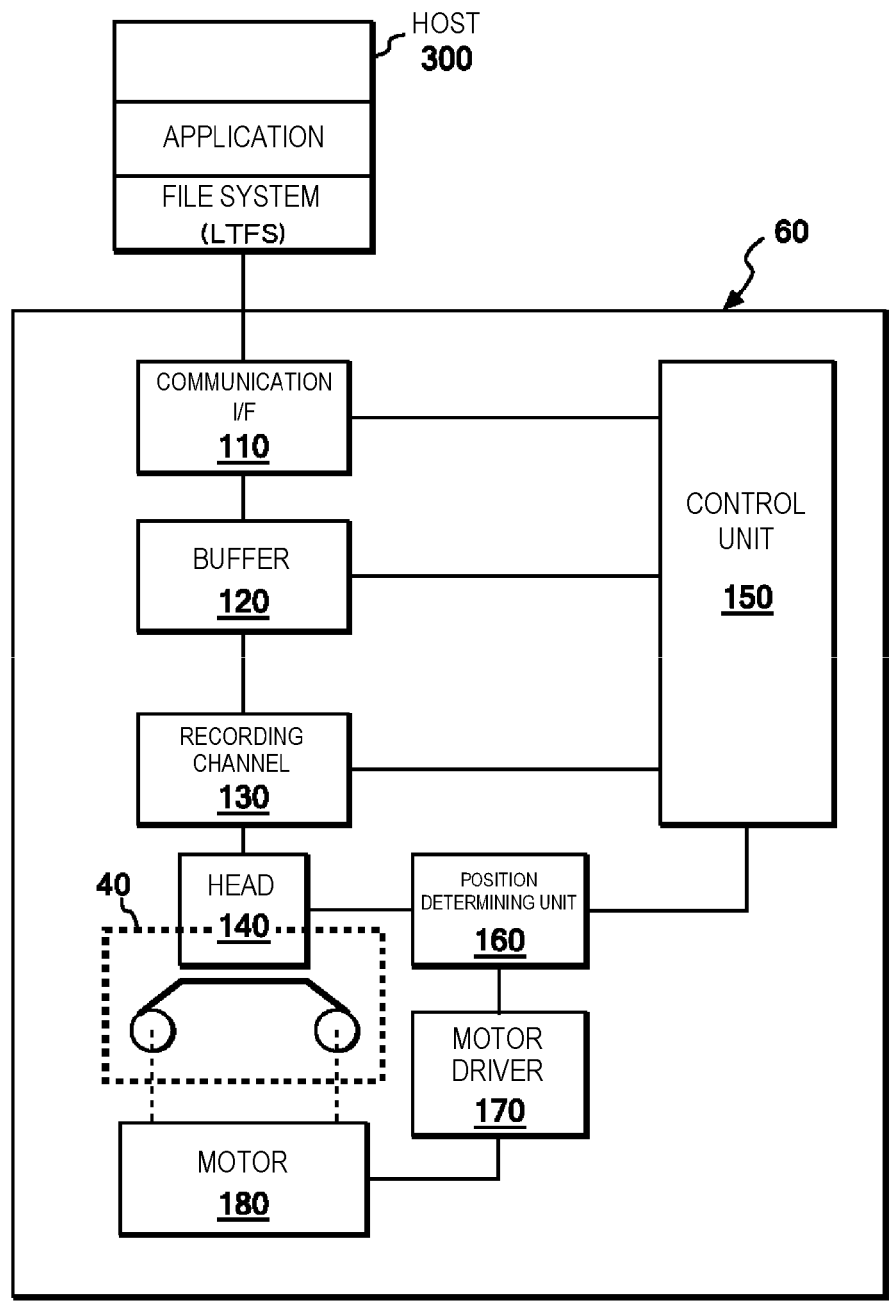
FIG. 4 illustrates hardware of a tape storage system (tape recording apparatus system) including a tape drive (magnetic tape apparatus) connected to a host.

FIG. 4 illustrates hardware of a tape storage system (tape apparatus system) including a tape drive (tape apparatus) connected to a host.

A tape drive 60 receives a request to read and write a file from an application of a host 300 via a file system (LTFS). The tape drive includes a communication interface (I/F) 110, a buffer 120, a recording channel 130, a reading and writing head 140, a control unit 150, a position determining unit 160, a motor driver 170, and a motor 180.

The interface 110 communicates with the host 300 via a network. For example, the interface 110 receives a write command for giving an instruction to write data onto a tape cartridge (a medium, a tape) 40, from the host 300. Further, the interface 110 receives a read command for giving an instruction to read data from the medium 40, from the host 300. The interface 110 has a function of compressing the written data and decompressing the read data, and increases the storage capacity to the medium close to about twice the actual data size.

The tape drive 60 reads and writes data with respect to the medium 40 in units of a data set (referred to as DS) constructed by a plurality of records sent from the application of the host 300. A typical size of the DS is 4 MB. The application of the host 300 designates a file name using a file system (for example, the LTFS-API (Application Program Interface)), and issues read and write access to the tape drive 60. The file system sends a request to write and read records in a SCSI command level to the tape drive. The DS is constructed by the plurality of records.

Each DS includes management information concerning the data set. User data is managed in units of a record. The management information is included in a data set information table (DSIT). The DSIT includes the number of records or blocks and the number of file marks (FMs) included in the DS, as well as the number of cumulative records and the number of cumulative FMs written from the beginning of the medium.

The buffer 120 is a memory in which data to be written onto the medium 40 and data read from the medium are temporarily accumulated. For example, the buffer 120 is configured by a dynamic random access memory (DRAM). The recording channel 130 is a communication path used to write out data accumulated in the buffer 120 onto the medium 40 or temporarily accumulate data read from the medium 40 into the buffer 120.

The reading and writing head 140 includes a data reading and writing element, and writes data onto the medium 40 and reads data from the medium. The reading and writing head 140 according to the present embodiment further includes a servo reading element, and reads a signal from a servo track provided to the medium 40. The position determining unit 160 instructs the reading and writing head 140 to move in the lateral direction (width direction) of the cartridge 40. The motor driver 170 drives the motor 180.

The tape drive 60 writes data onto the tape and reads data from the tape in accordance with a command received from the host 300. The tape drive 60 includes the buffer, a reading and writing channel, the head, the motor, reels on which the tape is wound, a read and write controller, a head position controlling system, and the motor driver. The tape cartridge is loaded on the tape drive. The tape moves in the longitudinal direction along with reel rotations. The head moves in the tape longitudinal direction to write data onto the tape and read data from the tape. Further, the tape cartridge 40 includes a non-contact non-volatile memory called cartridge memory (CM). The CM loaded on the tape cartridge 40 is read and written by the tape drive 60 in a non-contact manner. The CM stores a cartridge attribute therein. At the time of reading and writing, the tape drive takes out the cartridge attribute from the CM to enable optimal reading and writing.

The control unit 150 controls the entire tape drive 60. That is, the control unit 150 controls data writing onto the medium 40 and data reading from the medium 40, in accordance with a command received by the interface. Further, the control unit 150 controls the position determining unit 160 in accordance with a signal read from a servo track. Moreover, the control unit 150 controls a motion of the motor by means of the position determining unit 160 and the motor driver 170. Note that the motor driver 170 may be directly connected to the control unit 150.

FIG. 5 illustrates contents of the index partition and the data partition of the medium in the LTFS format.

(A) of FIG. 4 illustrates meta-information that is written onto the tape medium immediately after its initialization in the LTFS format.

Immediately after the initialization of the tape medium in the LTFS format, information illustrated in (A) is written onto the tape medium.

A format identification data set (FID) is special data that is written onto the beginning of the tape medium when the tape drive initializes the tape medium, and includes information such as the number of partitions on the tape medium and the capacity of each partition.

VOL1 Label is also called ANSI Label, and is a general format label defined literally by ANSI.

LTFS Label is a label defined in the LTFS format, and is a label that holds information indicating with which version of the LTFS format the tape medium is formatted in conformity. In this label, the size of a record to be written onto the medium is designated. The record size, which is 1 MB for example, is also referred to as block size.

File Mark (FM), which is generally used for a tape medium, is something like a bookmark, and is used to seek desired data. An application (such as the LTFS) issues "WriteFM0" as a SCSI command, and records an index for file separation into the tape medium.

Index#0 is an index written at the time of formatting. Because no file exists at this stage, Index#0 does not include information specific to a file, and is written to hold information such as a volume name of the tape medium.

(B) of FIG. 4 illustrates information that is written onto the tape medium in the case where a file is written after the initialization in the LTFS format.

If a file (File 1) is written after the initialization in the LTFS format, data written on the tape medium is changed to as illustrated in (B). Portions surrounded by thick lines each correspond to added or updated data. Index#1 includes meta-information (index) of File 1. The IP holds only the latest index, while the DP holds the index history. When to update the index depends on implementation of the file system. For example, the index is updated for each given time, or is updated only when the tape medium is taken out from the tape drive. In the case of further continuous use, only the latest index is always put in the IP, whereas a new file and a new index are appended in the DP without overwriting the existing indexes.

(C) of FIG. 5 illustrates information that is written onto the tape medium in the case where a file (File 2) is further written after the state of (B).

If the next file (File 2) is added after the first file (File 1) is written onto the tape medium, File 2 is stored into the tape medium continuously with stored File 1. Index#2 includes meta-information (index) of File 1 and File 2.

(D) of FIG. 5 illustrates meta-information that is written onto the medium after File 1 is updated by adding character information (File 1-2) to the tail end of File 1 after the state of (B).

A document creation application updates files written on a medium, and then records each file (File 1) in a fragmented manner (File 1-1 and File 1-2).

FIG. 6 illustrates changed contents of position meta-information and a file data portion (extent) included in the index file in the case where one file is partially rewritten.

The extent means position meta-information and a file data portion (fragment).

The index stores position information (pointer) of a file in a form called extent. An element of the extent includes: a number of a block (StartBlock) at the beginning of a portion (data portion) of the file; a start offset (ByteOffset) in the block of this number; a size (ByteCount) of the data; and a file position (FileOffset) of the data portion. User data is recorded in the medium in units of a record, that is, units of a size (for example, 512 KB) designated by the block size.

StartBlock indicates the order of blocks with a fixed size from the beginning of the tape medium. ByteOffset indicates an offset at which writing is started in a block of a particular number.

ByteCount indicates the data size of the data portion designated by the extent.

FileOffset indicates the file position of the data portion designated by the extent.

Each block includes a record or a file mark (FM: a separator of the record), and the size thereof is designated in LTFS Label. The user data is recorded in the medium in units of a record, that is, units of a size (for example, 512 KB) designated by the block size.

In a first case (A) of FIG. 5 in which File 1 having a size of L is recorded in the medium, the index shows an extent (x). File 1 corresponds to shaded portions that are continuously written in units of a record in the longitudinal direction of the tape medium. In the extent, each record corresponds to a block. In a case (B) of FIG. 5 in which the data portion is rewritten, it is assumed that File 1 is written in (A) and a data portion of 600 KB from the Mth byte in File 1 is then rewritten by a record of 250 KB. In this case, the index shows information about extents (x), (y), and (z). The extent (y) indicates the data (record) of 250 KB written by changing the data portion of 600 KB in File 1. This data is appended and written not as a continuous data portion but as a record of a subsequent block number (StartBlock: N+4).

The extent (y) appends and writes 250 KB from an offset ByteOffset=0 in StartBlock=N+4.

The extent (x) indicates data (record) up to ByteCount=M in StartBlock=N. The data of 600 KB from the offset M in the block N is changed.

The extent (z) indicates a data portion of ByteCount=L−(M+600) from ByteOffset=(M+600 K) mod D in StartBlock=N+2. D represents a block size (for example, 512 KB or 1 MB). ByteOffset is the remainder obtained by dividing M+600 KB by D, and gives an offset in the block number N+2.

The index of File 1 includes arrangement information indicating distribution into the plurality of extents (x)*(y)*(z) as a result of the data portion rewriting.

A specific method for writing a file according to the present invention is described.

Figure 7:
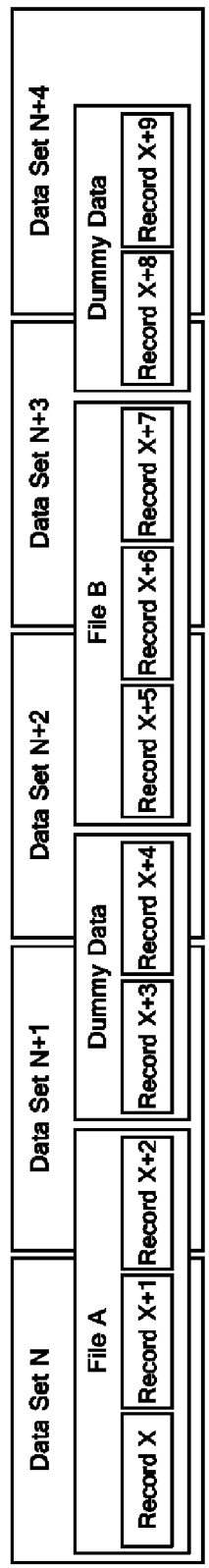
FIG. 7 illustrates a schematic diagram in the case where dummy data corresponding to the volume of one data set is written between adjacent files written on a tape medium.

FIG. 7 illustrates a schematic diagram in the case where dummy data corresponding to the volume of one data set is written between adjacent files written on a tape medium.

After each file is written, dummy data corresponding to the volume of one data set is written. The dummy data is formed by a plurality of records as dummies (dummy records). This guarantees that adjacent files do not exist within the same data set. In particular, because the file system for the tape drive (LTFS) is used in many cases to store a file having a relatively large file size in the broadcasting industry and other such industries, influences that are exerted on the capacity of the tape medium by writing the dummy data can be regarded as sufficiently small.

Figure 8:
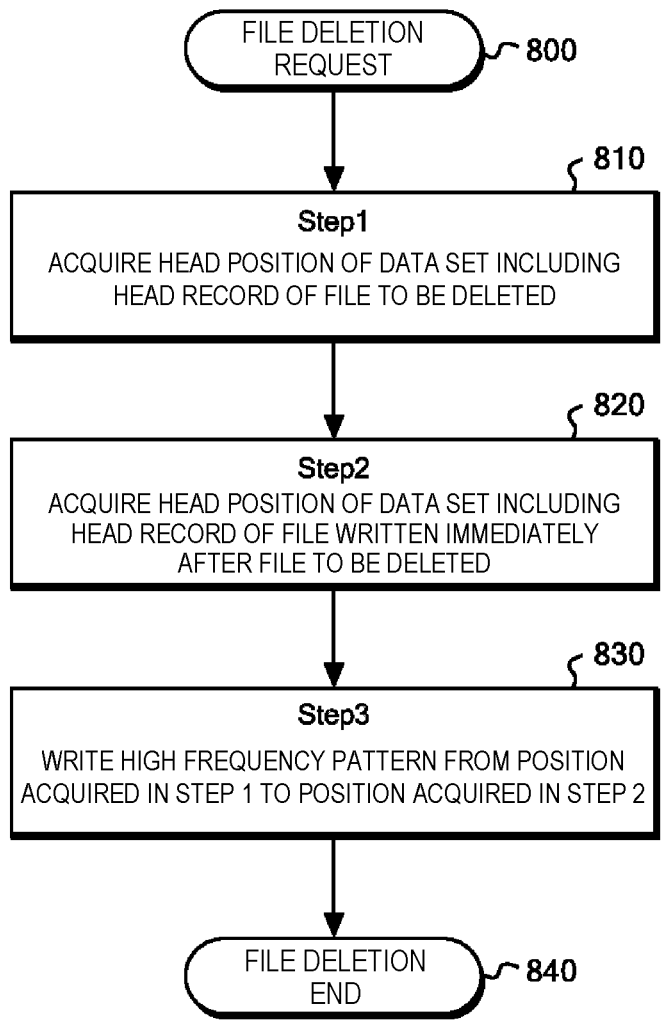
FIG. 8 illustrates a flowchart of a method for deleting a file according to the present invention.

FIG. 8 illustrates a flowchart of a method for deleting a file. Description is given of a method for deleting a file on a tape medium according to the present invention, in the case where the file is written according to the above-mentioned writing method.

Figure 9:
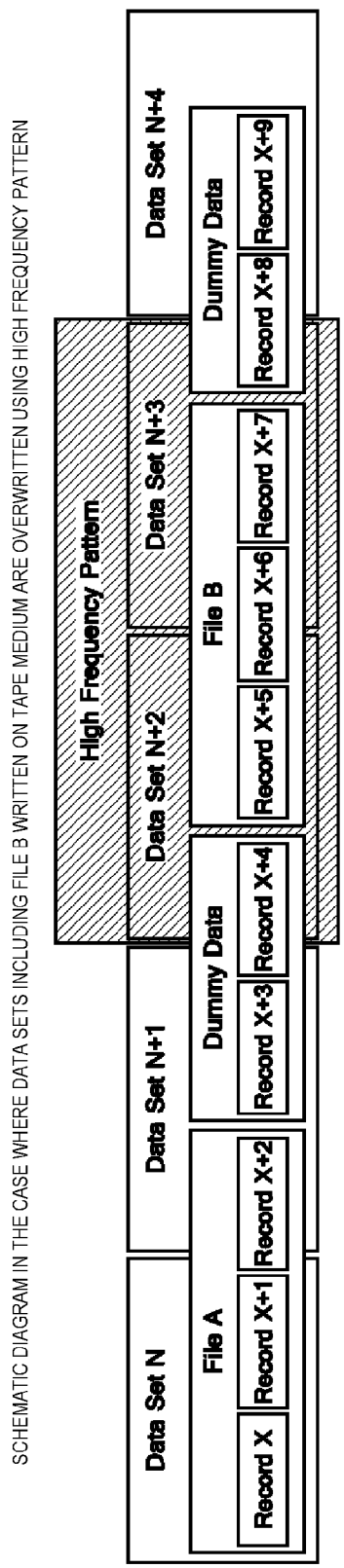
FIG. 9 illustrates a schematic diagram of deletion according to the present invention in the case where data sets including File B written on a tape medium are overwritten using a high frequency pattern.

FIG. 9 illustrates a schematic diagram of deletion according to the present invention in the case where data sets including File B written on a tape medium are overwritten using a high frequency pattern.

With reference to the flowchart of FIG. 8, deletion of File B in FIG. 9 is described as an example. In Step 1, a record #X+5 (record X+5) that is the head record of File B is located. "Read Position" as a SCSI command is issued to the tape drive. According to this command, the head position of a data set #N+2 (data set N+2) that is a data set including the head record of the file to be deleted can be acquired. Similarly in Step 2, the head position of a data set #N+4 (data set N+4) can be acquired in the same procedure as that in Step 1. The data sets are consecutively written, and the head position of the data set #N+4 can be equated with the tail position of a data set #N+3 that is a data set including a tail portion of File B. Although an interface for writing a high frequency pattern onto a specific region is not provided so far, Step 3 can be achieved by, for example, newly creating a SCSI command unique to a vendor.

The above description is based on the premise that each file stored in the tape medium is not distributed, that is, is formed by one extent (consecutive records). Next, description is given of the case where data of one file is written while being fragmented on the tape medium. In the case where the LTFS updates data of a recorded file or appends another data thereto, the data of one file is written while being fragmented into two extents as illustrated in (D) of FIG. 5. In the case where the data of one file is written while being fragmented, the method may further include identifying a configuration of a data set including records of extents into which the written file is fragmented. In actuality, one file is not necessarily formed by one extent, and may be formed by a plurality of extents. In other words, one file is recorded while being fragmented. In the case of writing/deleting such a file formed by a plurality of extents, each file in the above description may be read as an extent, dummy data may be written between adjacent extents, and all the extents forming the file to be deleted may be overwritten using a high frequency pattern.

Description is given of a behavior when the tape drive tries to read an arbitrary file after the arbitrary file is deleted from the tape medium according to the above-mentioned deleting method. Even if the tape drive tries to read the deleted file, data sets including records forming the deleted file are overwritten using a high frequency pattern. Because the high frequency pattern is written at the record positions of the file to be read, the tape drive cannot read the file, so that a read error occurs.

In the case of reading another file, if a region on which no data set is written continues at a length of four meters or more, data sets written thereafter cannot be sought for depending on implementation of the tape drive. If the above-mentioned deleting method is applied to data sets corresponding to a consecutive file, for example, a region that is overwritten using a high frequency pattern at a length of four meters or more may exist. In order to deal with such a tape drive, at the time of file writing, the file is divided into "another extent" at intervals of a little less than four meters from the tape head portion, and an appropriate amount of dummy data is written between adjacent extents, whereby one or a few data sets can remain at intervals of four meters even after the file deletion using the high frequency pattern.

A specific example of the writing method with four-meter limitation is described.

It is discussed here that a file is formed by one extent made of twenty consecutive records (records #101 to #120) in a conventional technique. A tape medium length corresponding to data of this number of records is assumed to be a little less than eight meters. In the present invention, the file is divided into two extents that are each formed by ten consecutive records (records #101 to #110 and records #115 to #124) and each have a length of a little less than four meters. Specifically, in order to avoid a data set blank of four meters or more, dummy data (records #111 to #114) is written between the two extents of the file. Although one file is formed by one extent in the conventional technique, a plurality of extents are used in the present invention, and the second and subsequent extents are each expressed as "another extent". Records having data (dummy data) unrelated to the extent of the file written immediately before are written at intervals of a little less than four meters, whereby the records forming the file become non-consecutive. As a result, the file is fragmented into the plurality of extents due to the interposition of data sets formed by the dummy data.

Description is given of influences that are exerted on the time to delete a file by the method for deleting the file according to the present invention.

Conventionally, it takes about three hours at the maximum to overwrite a file using a high frequency pattern. In the case of deleting a file that exists in a tail portion of the partition, the time to write the high frequency pattern from a tail portion of the file to the tail portion of the partition can be ignored. An average time to delete a file recorded at an arbitrary position can be regarded as approximately an hour and a half that is half the maximum required time. If the present invention is applied, the time to delete a file becomes equivalent to the time to write the file. That is, data corresponding to 160 MB per second can be deleted in the case of a sixth-generation linear tape open (LTO) tape drive, and data corresponding to 250 MB per second can be deleted in the case of a fourth-generation enterprise tape drive (TS1140). Here, the time to seek for the head portion of the file is not taken into consideration, and the time to seek therefor is not different from that when the conventional technique is applied (approximately 40 seconds on average, 80 seconds at the maximum).

When a tape medium is used for data exchange between companies in the financial industry and other such industries, it is not uncommon to write only as small as a few gigabytes (a little less than 1% of the entire capacity) of data onto a head portion of the tape medium. Under the circumstance, it is extremely advantageous to reduce the time to delete a file by using the method for deleting data sets according to the present invention.

Note that an embodiment of the file system for the tape apparatus (LTFS) has been described above. Further, the present invention can also be applied to the case where files of other applications are written and deleted in the tape apparatus.

As described above, the tape drive to which the method of the present invention is applied enables an arbitrary file to be physically overwritten in a short time using a high frequency pattern. Moreover, the tape drive records dummy data between adjacent files, to thereby enable a specific file to be physically deleted without any influence on other files. Note that the present invention is described by way of the embodiment mode (embodiment), but the scope of the present invention is not limited to the above-mentioned embodiment. It is obvious for those skilled in the art that various changes and alternative modes can be adopted without departing from the spirit and scope of the present invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for writing, by a tape apparatus, a file from an application of a host onto a tape, the method comprising:
   sequentially receiving a plurality of records forming the file from the application; adding a predetermined number of segments of dummy data (dummy records) subsequently to the plurality of records forming the file such that the records of the file and records of a subsequent file are not included in the same data set;
   interposing the dummy records between a final record of the file and a head record of the subsequent file to construct at least one data set that is adjacent to one data set and does not include the records of the file; and
   writing a data set including the records of the file, a data set including the final record of the file and the dummy records, and a data set including the subsequent file, onto the tape;
   wherein adding the predetermined number of segments of dummy data includes receiving the dummy data as the predetermined number of dummy records from the application, wherein the tape apparatus is a linear tape file system (LTFS),
   wherein the maximum length of the records of the file is 1 MB, and a file size larger than 1 MB is divided into a plurality of records, wherein the file being in a first data set and the subsequent file being in a second data set, wherein the predetermined number of segments of dummy records are added such that the first data set remains even after deletion of the file,
   wherein the predetermined number of segments of dummy records are added such that the files is physically overwritten using a high frequency pattern, wherein records within a particular data set are interleaved using an interleaving function: further comprising: dividing the file.

* * * * *